United States Patent [19]

Dupuy et al.

[11] Patent Number: 5,014,464
[45] Date of Patent: May 14, 1991

[54] WINDOW PANE SEALING STRIP HAVING A FLEXIBLE REINFORCED GLASS-RUN CHANNEL

[75] Inventors: Ronald E. Dupuy, Wabash, Ind.; Donald P. Agee, Southfield, Mich.

[73] Assignee: GenCorp Inc., Fairlawn, Ohio

[21] Appl. No.: 317,315

[22] Filed: Mar. 1, 1989

[51] Int. Cl.$^5$ .............................................. E06B 7/16
[52] U.S. Cl. ........................................ 49/440; 49/491
[58] Field of Search ................. 49/440, 441, 374, 376, 49/490, 491, 488, 502

[56] References Cited

U.S. PATENT DOCUMENTS

| | | |
|---|---|---|
| 2,699,581 | 1/1955 | Schlegel . |
| 2,726,894 | 12/1955 | Bugbee . |
| 2,790,214 | 4/1957 | Edwards, Sr. et al. . |
| 2,817,558 | 12/1957 | Kubacka et al. . |
| 3,455,018 | 7/1969 | Collins . |
| 3,918,206 | 11/1975 | Dechmahl . |
| 4,072,340 | 2/1978 | Morgan . |
| 4,103,459 | 8/1978 | Barnerins et al. . |
| 4,210,356 | 7/1980 | Junemann et al. . |
| 4,235,056 | 11/1980 | Griffin . |
| 4,261,610 | 4/1981 | Inamoto et al. . |
| 4,270,792 | 6/1981 | Mathieson et al. . |
| 4,295,306 | 10/1981 | Garman . |
| 4,343,121 | 8/1982 | Kruschwitz et al. . |
| 4,347,693 | 9/1982 | Kruschwitz . |
| 4,349,994 | 9/1982 | Maekawa . |
| 4,387,923 | 6/1983 | Choby et al. . |
| 4,401,340 | 8/1983 | Ankrapp . |
| 4,438,609 | 3/1984 | Nielson et al. . |
| 4,483,113 | 11/1984 | Kruschwitz . |
| 4,490,942 | 1/1985 | Arnheim et al. . |
| 4,649,668 | 3/1987 | Skillen et al. . |
| 4,783,931 | 11/1988 | Kirkwood ............................. 49/491 |
| 4,864,774 | 9/1989 | Onishi ................................. 49/491 |

Primary Examiner—Kenneth J. Dorner
Assistant Examiner—Gerald A. Anderson

[57] ABSTRACT

A molding strip is provided for sealing a gap between a slidable window pane and an adjacent frame structure. The molding strip is substantially S-shaped and comprises an inverted U-shaped flange seat which shares a common wall with a U-shaped glass-run channel. The flange seat is comprised of a first elastomer while the glass-run channel is comprised of a second higher durometer elastomer. The higher durometer elastomer extends at least 25 percent of the height of the common wall so that the glass-run channel is held rigidly in position against the flange as well as against the window and the adjacent sheet metal mounting surface. The glass-run channel further includes interior and exterior sealing lips which form a sealing contact with the window pane. The contacting surface of the sealing lips and the window channel base have a low friction surface.

28 Claims, 2 Drawing Sheets

WINDOW PANE SEALING STRIP HAVING A FLEXIBLE REINFORCED GLASS-RUN CHANNEL

FIELD OF THE INVENTION

This invention relates to molding strips which have a "glass-run" channel section in which the edge portion of vehicle movable window panes ride. The purposes of such molding strips is to provide a means connecting the slidable window pane to an adjacent vehicle frame structure and to seal out water, air, dirt, and noise from entering the inside of the vehicle through this connection.

BACKGROUND ART

Vehicle manufacturers have devoted considerable effort in recent years to making their vehicle surfaces aerodynamically smooth, to cut down the wind resistance and decrease fuel consumption. Window areas of passenger vehicles are now receiving attention in this regard as window panes that are recessed from the surrounding vehicle body frame cause air turbulence in the areas where the frame bulges out from the window. In the past, most vehicle window panes, particularly those that slide up and down, have been recessed because the most convenient way to mount them is with a seal structure that either bulges out from the car body frame, or is held within a portion of the vehicle frame that bulges outwardly in relation to the window pane.

Examples of conventional molding strips that provide sealing channels for slidable window panes are shown in U.S. Pat. Nos. 2,726,894 and 3,918,206.

A recent vehicle window seal that does maintain the outer surface of the pane flush with both the seal and the adjacent vehicle frame surface is shown in U.S. Pat. No. 4,483,113, assigned to Draftex Development, A.G. This seal enables a stationary vehicle window pane to be secured to the frame with only a thin metal clip covering the outside edge of the pane. However, in order to maintain the window pane in place, a hard plastic insert must be pressed into a slot in the seal surrounding the window pane as a final step in mounting the pane. Obviously, a structure such as this would not work for a slidable pane, because it relies on a locking plastic insert that would have to be taken out and reinserted each time the window was rolled down or up.

U.S. Pat. No. 4,649,668 shows a sealing element having a reinforced elastomeric U-shaped member that receives a flange portion of the vehicle body and a glass-run channel which is formed of a harder elastomer.

U.S. Pat. No. 4,103,459 similarly relates to a channel-shaped sealing strip having a metal carrier covered in an elastomeric material and including a sealing gasket of softer material.

U.S. Pat. No. 4,270,792 relates to a window molding assembly in which a wire carrier is encapsulated in a cured material.

SUMMARY OF THE INVENTION

The object of the present invention is to provide a molding strip having a non-reinforced glass-run channel portion whereby the strip seals the gap between a slidable window pane and an adjacent frame structure. The strip has an improved construction that rigidly holds the window pane from outward movement away from the vehicle and maintains the window pane nearly flush with the outermost surface of the seal while maintaining a seal against water and dirt and allowing for a wide tolerance in the position of the window pane.

To accomplish these purposes the molding strip is provided with an S-shaped sealing means for securing the strip to the adjacent vehicle frame. The sealing means includes two opposing channels of each having a substantially U-shaped cross-section with inside and outside legs and a base member extending between the base ends of the legs. The inside channel forms a flange seat and comprises a lower durometer elastomeric material which substantially encapsulates a reinforcing carrier. The inside channel shares a common wall with the outside channel. The outside channel forms the glass-run channel and is made of a relatively higher durometer elastomeric material. The common wall comprises the outside wall of the flange seat and the inside wall of the glass-run channel. The inside wall of the glass-run channel extends at least 25 percent of the height of the common wall, which distance is a sufficient height so that the higher durometer elastomer of the outside channel engages the reinforcing carrier. A sealing member of a softer elastomeric material extends from the outside leg of the glass-run channel into the path of the slidable window pane at a location that is near the distal end of the outside leg. The lower durometer polymer further forms an inverted sealing lip or gasket which engages the vehicle exterior. The sealing member is deflectable toward the base member in response to contact with the window pane, thereby forming a first sealing interface with the window pane. There is a friction reducing coating, such as flock or a silicone or a polyurethane coating, on the surface of the sealing member which contacts the window pane. In addition, a second sealing lip, also of softer or lower durometer elastomeric material, extends from the inside leg at a location near the distal end of the inside leg. This sealing lip extends outwardly into the path of the slidable window pane, and is deflectable inwardly and toward the glass-run channel in response to contact with the window pane. This sealing lip thus forms a second sealing interface with the window pane and also biases the pane outwardly against the portion of the outside leg that extends beyond the sealing member. The sealing finger is also provided with a friction reducing coating such as flock or a silicone or polyurethane coating on its surface which contacts the window pane. The harder durometer channel is cured in an open position and is stressed to a more closed position relative to the common wall in order to bias the lower gaskets against the vehicle sheet metal and to bias the exterior sealing lip against the window pane.

DETAILED DESCRIPTION

Figure 1:
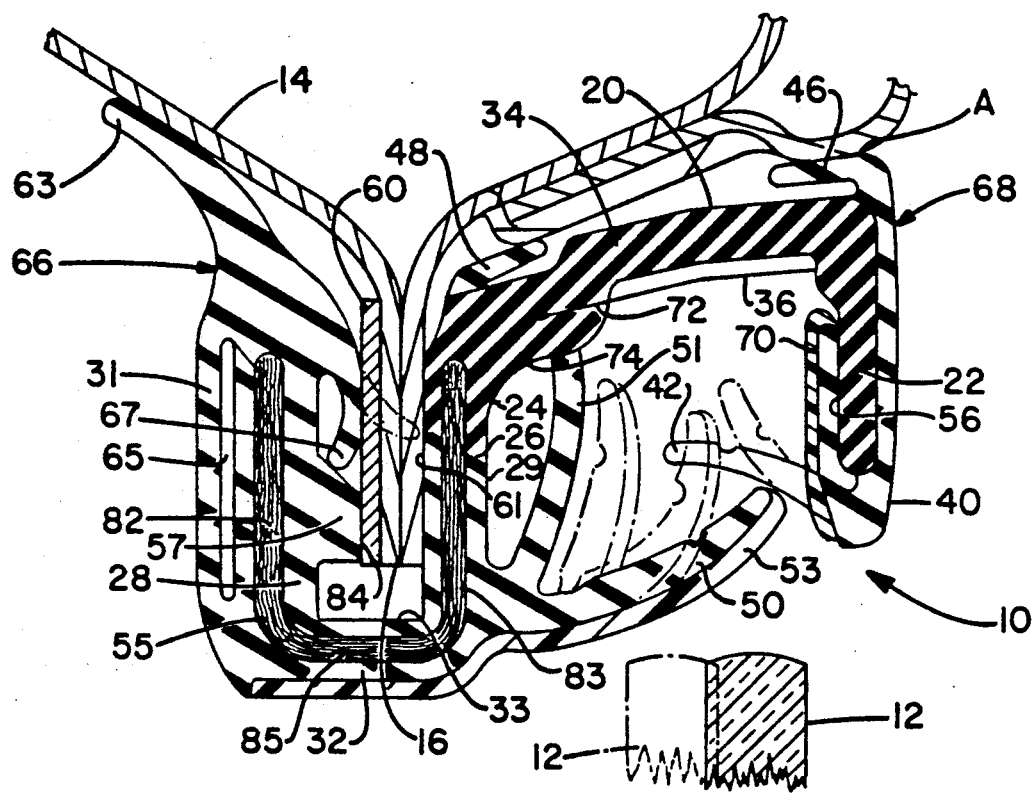
FIG. 1 is a cross-section of a molding strip mounted on a vehicle frame structure and having a glass-run channel, illustrating one embodiment of the invention.

Referring to FIG. 1, a door frame member 14 has a flange 16 surrounding a window aperture. An optional sheet metal frame thickness 60 can exist adjacent to flange 16. Strip 10 is mounted on the flange 16. The strip 10 is formed of opposing substantially U-shaped channels joined by a common wall 26 so that the strip 10 generally has an S-shaped cross-section. The orientation of the strip 10 shown in FIG. 1 shows the exterior of the vehicle shown at "A". The terms "exterior" and "interior" will be used to refer to the various part of orientation of the strip relative to the interior and exterior of the vehicle and to each other.

The interior channel portion 66 of the strip 10 is shown as a U which forms a flange seat 28. The exterior channel portion 68 of the strip 10 is shown as an inverted U which forms a glass-run channel 20. The interior channel portion 66 has an interior leg 31 and an exterior wall 29 joined by an intermediate base wall 32 which includes an inside surface 33 which opposes a distal end of the flange 16.

The flange seat 28 is formed of a soft or lower durometer elastomer having a Shore A hardness of from about 60 to about 80, and preferably from about 65 to about 75. A preferred elastomer is ethylene propylene diene monomer (EPDM). The flange seat 28 includes a reinforcing carrier 55 which can be a solid metal channel, or more preferably, a flexible looped wire channel. The carrier 55 is also U-shaped and has an interior leg 82 and an exterior leg 83 joined by an intermediate base wall 85.

The exterior wall 29 of the interior channel portion 66 has an inside surface 61 which sealingly engages the exterior surface of the flange 16 and thereby secures the glass-run channel 20 in its position against the flange 16. The inside surface 61 is held on the flange 16 by means of an opposing bumper 57 on the interior leg 31, and having an inside surface 84 which engages the interior surface of the flange 16. The interior leg 31 further includes an interior lip 67 which seals the strip 10 to the flange 16.

The interior leg 31 extends into a membrane 63 which deflects to seal along an interior portion of the vehicle door 14. The interior leg 31 further includes an elongated void 65 that has a height substantially corresponding to the length of the interior leg 82 of the reinforcement carrier 55. This void presents a smooth exterior surface of the interior leg 31 and avoids the appearance of ripples caused by carrier 55.

The exterior channel portion 68 of the sealing strip 10 forms a glass-run channel 20. The channel 20 has an interior wall 24 and an opposing exterior wall 22 joined by a common intermediate wall 34 which has an inside surface that forms a glass bearing surface 36 for the bottom edge of a window pane 12. Glass-bearing surface 36 is a low friction material such as silicone, polyurethane, low friction flocking, or polypropylene. The glass-run channel is composed of a higher durometer or harder elastomer which has a Shore D hardness of from about 30 to about 50. The elastomer is preferably EPDM.

Figure 2:
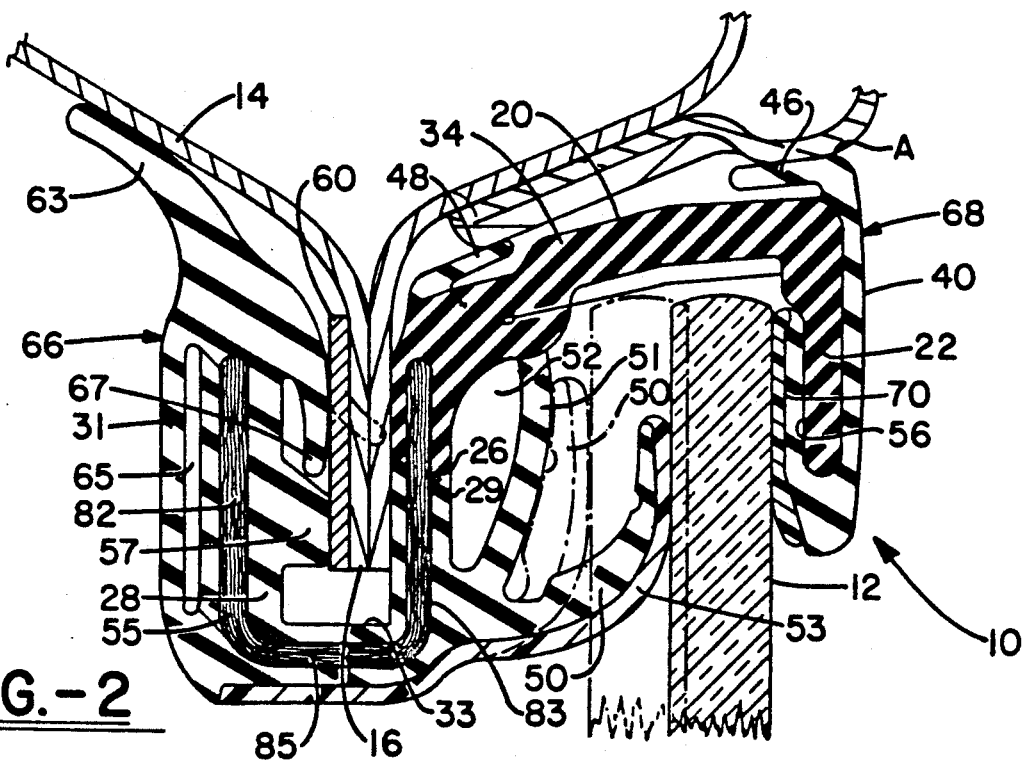
FIG. 2 is a cross-section of the molding strip of FIG. 1 showing part the strip deflected by a window pane slidable with respect to the frame structure.

The intermediate wall 34 includes an interior sealing lip 50 at its distal end. The interior sealing lip 50 extends substantially into the channel in the path of the sliding window pane 12. The top surface of the lip 50 engages the window pane and biases it toward the opposite wall. The lip 50 is also configured so that it deflects as the window slides in the channel 20. Further, the lip extends sufficiently so that it forms a seal with the window pane and makes a seal even though there may be a certain amount of play in the window. As is shown in FIG. 2, the lip 50 contacts the window in the exterior position and in the interior position shown in phantom.

The lip is comprised of the lower durometer elastomer described earlier and further includes a surface finish 53 on the window contacting surface which is low friction and which improves durability. This finish 53 can be a coating of an appropriate material such as a silicone or a polyurethane, or it can be a low friction flocking. A surface finish 53 preferably extends substantially across the top surface of the intermediate base wall 32.

The glass-run channel 20 further includes a membrane 51 which defines a dead air space 52 to dampen the transmission of noise into the vehicle interior.

The exterior wall 22 of the glass-run channel 20 includes an exterior sealing lip 42 at its distal end. The lip 42 extends substantially into the channel in the path of the window pane. The lip 42 comprises the soft elastomer described earlier and is configured so that it deflects as the window pane slides. The exterior wall 22 includes a recess 56 in the exterior wall that accommodates the lip 42 when the window pane is in its flush position. The lip 42 is further configured so that it will provide a sealing engagement with the window when the window is positioned in the position shown in phantom in FIG. 1. The lip 42 also includes a surface finish 70 on top surface 43 which sealingly engages the surface of the window pane. The surface is a low friction finish 70 and provides a higher durability. The surface can be a coating, such as a silicone or a polyurethane, or a low friction flocking or even a coextruded low friction surface.

The exterior wall 22 of the channel further includes an inverted lower exterior lip 46 that is biased downward to engage the exterior surface of the vehicle body. The lower exterior lip 46 is made of the lower durometer elastomer previously described. Further, a surface polymer 40 of the lower durometer elastomer extends between the sealing lip 42 and the lip 46 since it has a superior surface appearance relative to the harder durometer polymer. For example, it eliminates visible knit lines between different durometer polymers.

The interior wall 24 of the glass-run channel 20 includes an interior sealing lip 48 which is also biased downward to provide a further seal with the vehicle body. This interior lip 48 is also comprised of the lower durometer elastomer described previously.

The interior channel portion 66 and the exterior channel portion 68 of the sealing strip have a single common wall 26 which is composed at one end of the higher durometer elastomer and at the other end of the reinforced lower durometer elastomer of the exterior wall 29 of the flange seat 28. The single common wall 26 has a total vertical height X. The interior wall 24 extends at least 25 percent of the height X of the single common wall. Thus, the bend 74 formed at the join between the interior wall 24 and the common intermediate wall 34 of the glass-run channel is formed of a higher durometer elastomer and is therefor more rigid and less likely to deflect than the prior art glass-run channels. Moreover, the higher durometer elastomer extends sufficiently into the single common wall to contact and surround the carrier 55. In particular, when a wire carrier is used, the elastomer encapsulates and becomes enmeshed with the carrier. This also unifies the sealing strip 10 and helps to prevent deflection of the glass bearing surface 36. As a result of this configuration, the sealing portions of the sealing strip are made of a soft sealing elastomer while the glass-run channel is rigid and secure while being unreinforced. By "unreinforced," it is meant that the channel does not have a metal or other discrete reinforcing means. This does not mean that the elastomer can not include reinforcing fillers such as fibers or other reinforcing fillers as are known in the art.

The sealing strip of the present invention is made on conventional equipment by coextrusion. The high and low durometer elastomers are crosslinked together during extrusion.

Figure 3:
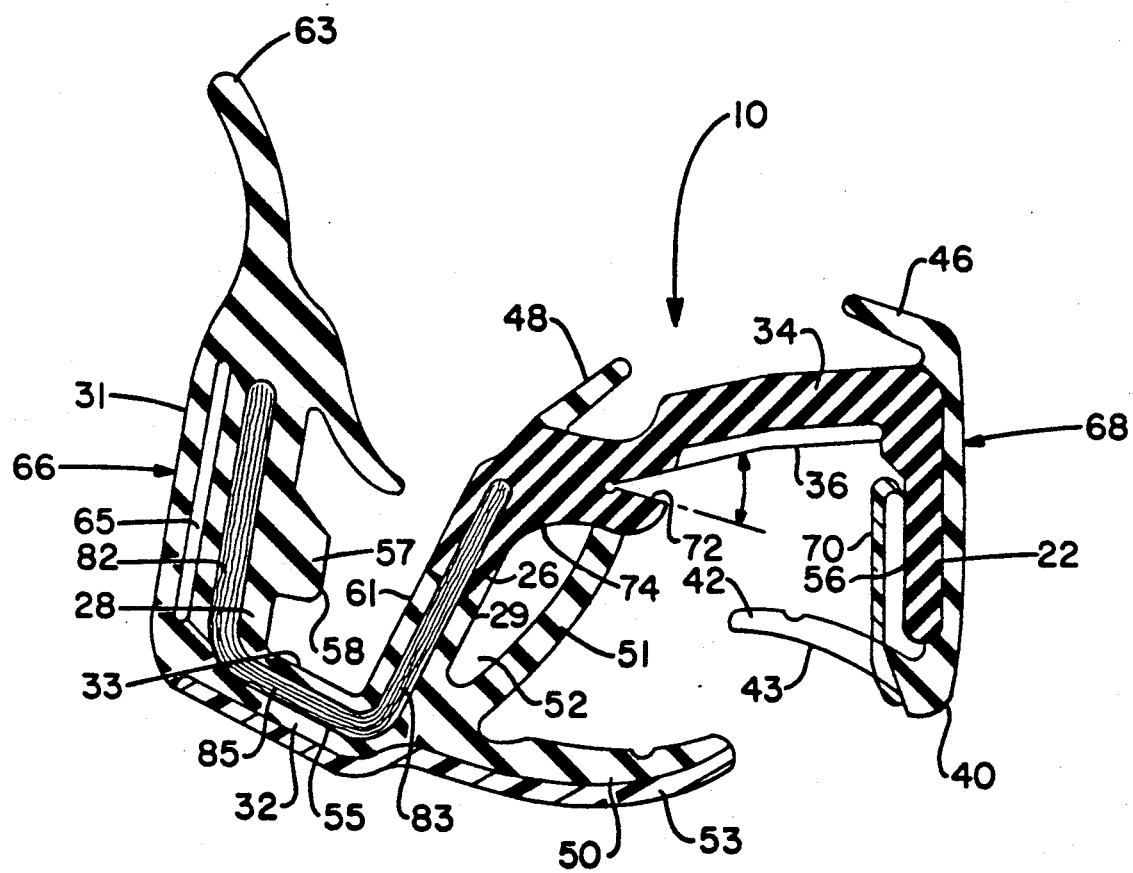
FIG. 3 is a cross-section of a molding strip extrudate in accordance with the invention.

FIG. 3 shows the sealing strip of the present invention as extruded. Both the interior channel 66 and the glass run channel 68 are extruded in slightly open positions, i.e., the angle to the common wall is greater than 90°. The interior channel 66 is extruded in this open position in order that the curing medium, such as heated glass beads, will penetrate fully into the channel. After curing, the channel is closed, or brought back to about 90° by bending the wire carrier into position.

In contrast, the higher durometer channel 68 is cured in this open position in order that the channel 68 will have a "memory," that is so that the channel will be biased against the sheet metal to cause sealing pressure to cause better engagement of the lower sealing lip 46 against the window sheet member 14. Then the extrudate is mounted in position on the vehicle door, the door frame 14 forces the channel upward so that the bend 74 is closed, as well as the gap 72.

While in accordance with the Patent Statutes, the best mode and preferred embodiment has been set forth, the scope of the invention is not limited thereto, but rather by the scope of the attached claims.

What is claimed is:

1. A substantially S-shaped window sealing strip for a window opening having a flange member, comprising:
   an inverted U-shaped flange seat comprised of an elastomer having a Shore hardness of from about 60 to about 80, and an encapsulated flexible carrier; and
   a U-shaped glass-run channel comprising a harder elastomer having a Shore D hardness of from about 30 to about 50, said flange seat and said glass-run channel integrally forming a common wall and having at least a portion of said flexible reinforcing carrier therein, a portion of said carrier in said common wall encapsulated by said harder elastomer.

2. An integral generally S-shaped sealing strip for use between a movable window pane and an adjacent vehicle body opening having a flange, comprising:
   a window pane receiving channel, and
   a gripping channel,
   each of said channels having an interior and an exterior wall joined by a base,
   said exterior wall of said gripping means channel and said interior wall of said pane receiving channel being a common wall, said common wall containing at least a portion of a flexible reinforcing carrier,
   said gripping means channel including gripping means adapted to secure the sealing strip to said flange and being comprised of an elastomer encapsulating a portion of said carrier in said common wall and having a Shore A hardness of from about 60 to about 80, and
   said glass receiving channel and not less than the 25 percent of said common wall being comprised of an elastomer encapsulating a portion of said flexible carrier and having a Shore D hardness of from about 30 to about 50.

3. A sealing strip as set forth in claim 2 wherein said glass receiving channel includes an exterior sealing lip to provide an exterior sealing contact with said window pane.

4. A sealing strip as set forth in claim 3, wherein said exterior lip further includes a low friction surface.

5. A sealing strip as set forth in claim 3, wherein said glass receiving channel includes a glass bearing surface disposed between said interior wall and said exterior wall, and said window pane bearing surface includes a low friction surface.

6. A sealing strip as set forth in claim 5, where said low friction surface comprises polyurethane, silicone, or polypropylene.

7. A sealing strip as set forth in claim 6, wherein said flexible reinforcing carrier is a looped wire carrier.

8. A sealing strip as set forth in claim 3, wherein said glass receiving channel includes an interior sealing lip to provide a sealing contact with the interior surface of said window pane, and said interior lip is comprised of said elastomer having a Shore A hardness of from 60 to 80.

9. A sealing strip as set forth in claim 8, wherein said interior sealing lip further includes a low friction surface.

10. A sealing strip as set forth in claim 9, wherein said low friction surface is a layer of polyurethane, silicone or polypropylene.

11. A sealing strip as set forth in claim 10, wherein said flexible reinforcing carrier is a looped wire carrier.

12. A sealing strip as set forth in claim 9, wherein said low friction surface is a layer of flocking.

13. A sealing strip as set forth in claim 8, wherein said flexible reinforcing carrier is a looped wire carrier.

14. A sealing strip as set forth in claim 8, wherein said flange seat is an elastomer having a Shore A hardness of from about 65 to about 75, and wherein said exterior and said base of said glass run-channel are unreinforced.

15. A sealing strip as set forth in claim 14, wherein said flexible reinforcing carrier is a looped wire carrier.

16. A sealing strip as set forth in claim 2, wherein said resilient reinforcement means comprise a flexible looped wire carrier.

17. A sealing strip as set forth in claim 16, wherein said glass receiving channel comprises EPDM, and said flange seat comprises EPDM.

18. A sealing strip as set forth in claim 17, wherein said glass receiving channel is cured at an angle so that when it is in position on a vehicle door, it is biased against said door.

19. A sealing strip as set forth in claim 18, wherein said flexible reinforcing carrier is a looped wire carrier.

20. An integral S-shaped window sealing strip for use between a window pane and an aperture in a vehicle body which includes a flange, comprising:
   a flange seat capable of engaging said flange and including an interior wall, an exterior wall and an intermediate base, said flange seat being comprised of an elastomer having a Shore A hardness of from about 60 to about 80;
   a glass receiving channel comprising an interior wall, an exterior wall and an intermediate glass bearing base, said glass receiving channel being comprised of an elastomer having a Shore D hardness of from about 30 to about 50, said interior wall of said glass receiving channel and said exterior wall of said flange seat being a continuous single common wall, said common wall containing at least a portion of said flexible reinforcing carrier, at least 25 percent of said continuous common wall containing a portion of said flexible reinforcing carrier comprised of the same material as said glass receiving channel and the remaining portion of said carrier contained by said flange seat material.

21. A window sealing strip as set forth in claim 20, wherein said flexible reinforcing carrier is a looped wire carrier.

22. A window sealing means as set forth in claim 20, wherein said glass receiving channel and said flange means seat are coextruded.

23. A window sealing means as set forth in claim 22, wherein said glass receiving channel further comprises an interior sealing lip which extends substantially into said glass receiving channel, an exterior sealing lip which extends substantially into said receiving channel and which provide a sealing contact within a wide tolerance of the window position.

24. A window sealing strip as set forth in claim 23, wherein said flexible reinforcing carrier is a looped wire carrier.

25. A window sealing means as set forth in claim 23, wherein said glass receiving channel includes a glass bearing surface between said interior lip and said exterior lip and said glass bearing surface having a low friction surface.

26. A window sealing means as set forth in claim 25, wherein said glass bearing surface is polypropylene, polyurethane, or silicone.

27. A window sealing strip as set forth in claim 26, wherein said flexible reinforcing carrier is a looped wire carrier.

28. A window sealing means as set forth in claim 25, wherein said glass bearing surface is cellular sponge.

* * * * *